July 6, 1965    J. H. ASHBY ETAL    3,192,727
ISOTHERMAL REFERENCE APPARATUS
Filed June 12, 1964    2 Sheets-Sheet 2
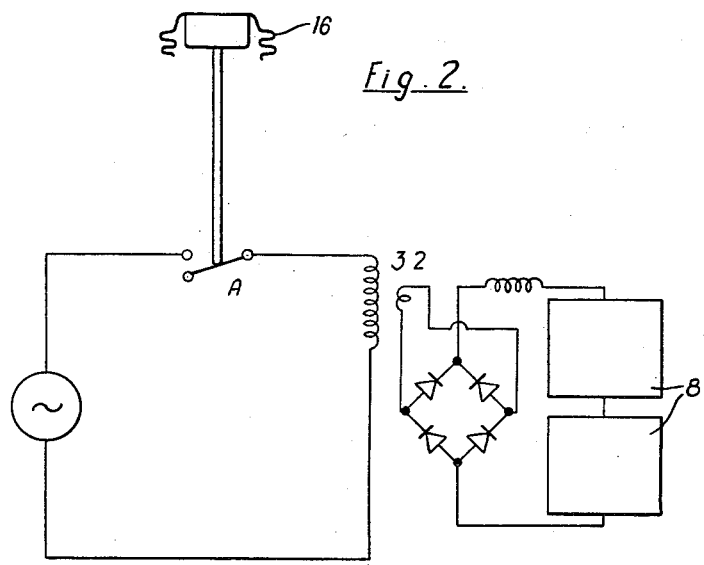
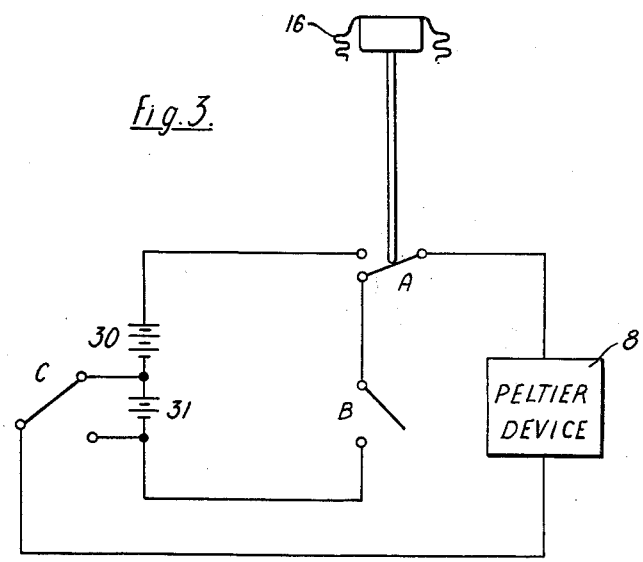
Inventors
John Henry Ashby
Donald Moore Barton
By
Stevens, Davis, Miller & Mosher  Attorneys

United States Patent Office 3,192,727
Patented July 6, 1965

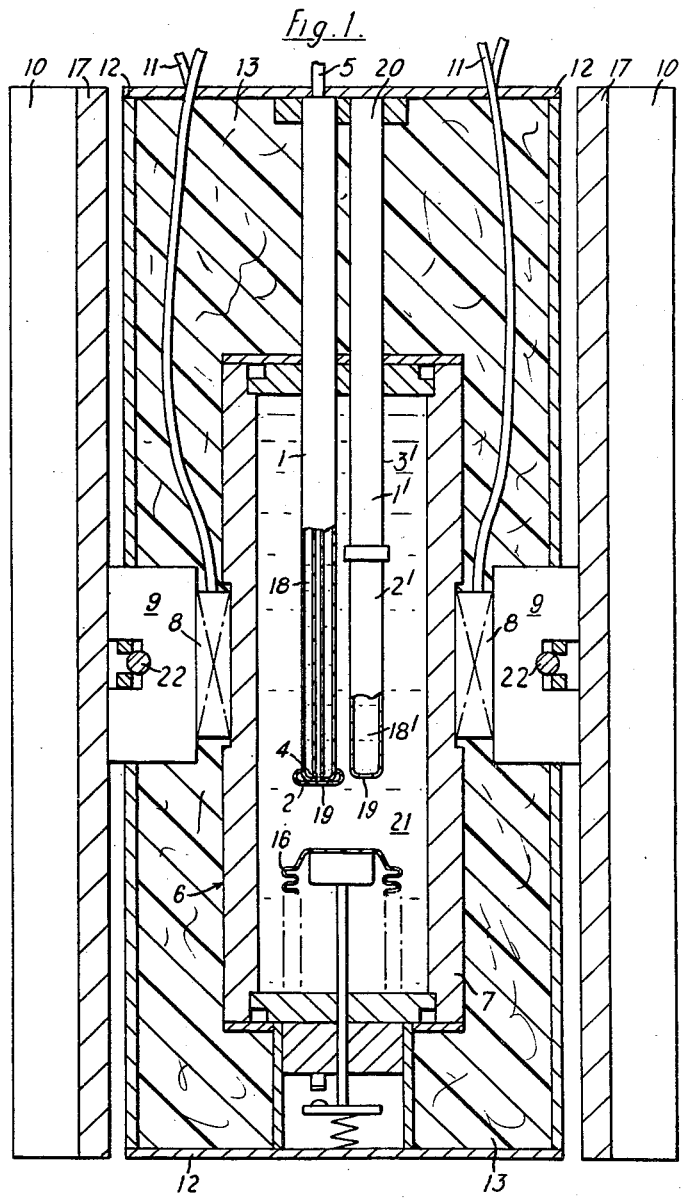

3,192,727
ISOTHERMAL REFERENCE APPARATUS
John Henry Ashby, London, and Donald Moore Barton, Langley, Buckingham, England, assignors to De La Rue Frigistor Limited, London, England, a British company
Filed June 12, 1964, Ser. No. 374,748
Claims priority, application Great Britain, July 12, 1963, 27,809/63
7 Claims. (Cl. 62—3)

This invention relates to an improved method and apparatus for maintaining thermocouple junctions at a constant known temperature utilizing thermoelectric cooling and change of state of a working substance. With such devices the working liquid is usually water and the thermocouple junctions are maintained at or very close to 0° C.

Thermocouples comprise two junctions one being placed at the spot whose temperature it is desired to measure and the other, the reference junction, being maintained at a known temperature, which is customarily and conveniently 0° C. Since in general it is desired to measure more than one temperature, and often to measure or detect temperatures continuously or periodically over a considerable time, a device for bringing the temperature of the reference junction speedily to 0° C. or any other convenient known temperature and maintaining it constantly at this temperature over a period of time is essential for the full utilization of the thermocouple. Desirably this device should be automatic and not require continual maintenance such as might distract the attention of an observer. Frequently the temperature or temperatures are automatically recorded and automatic thermostatic control of the reference junction permits the temperature recording apparatus to be left for considerable periods. A further desirable property is that the device should permit a temperature to be read rapidly as the occasion arises, requiring only the short time necessary for the two junctions to reach thermal equilibrium with their surroundings, i.e. for one junction to reach the reference temperature, and the other the temperature to be measured.

Hitherto such automatic thermocouple reference devices have worked on the principle of immersing the junction whose temperature it is desired to maintain steady, directly in the working substance. It is desirable in most forms of such apparatus to hermetically seal the container containing the working liquid, and this means sealing the junction in the working liquid. Thus the number and nature of the junctions sealed into the apparatus during its manufacture limit in kind and number the thermocouples whose junctions can be kept at the desired temperature, for example commercial thermocouple junction reference chambers include six or less junctions.

It is an object of the present invention to provide an improved apparatus for maintaining thermocouple junctions at a reference temperature.

The apparatus according to the present invention comprises a chamber containing a liquid freezable at a temperature at or close to said reference temperature, an elongated tube extending through one of the walls of said chamber and having a closed end situated deep in said chamber interior, the other end of the tube giving access to the exterior of the chamber, the interior surface of said tube being adapted to accommodate at least one thermocouple junction closely adjacent to the closed end, thermoelectric cooling means positioned to cool the chamber to freeze the liquid therein and detecting means sensitive to the change of state of said liquid to control supply of current to said thermoelectric cooling device when a certain proportion of the liquid is frozen.

By contrast to prior apparatus, commercial models made according to the present invention at comparable or even less cost, can conveniently accommodate 180 such junctions, with no limit as to the nature of the constituents of the junctions except insofar that the heat leak provided by the total number of junctions must not be excessive, i.e. must not partially or completely overload the device.

The tube for containing the thermocouple junctions preferably projects beyond the walls of the thermostatically controlled chamber. Desirably the tube is thin-walled and constructed of two different materials, the portion of the tube at and near the closed end being constructed of material of good thermal conductivity, e.g. copper, silver, gold, aluminum or beryllium oxide, and the portion of the tube near the outer walls is ideally constructed from a material which thermally insulates it from the walls of the chamber and from ambient. However, in practice, it has been found that a long narrow thin-walled stainless steel tube has sufficient resistance to the longitudinal passage of heat, and if its closed end is constructed of copper, provides for adequate passage of heat to the working substance from the junctions to give a sufficient accuracy of temperature control for most purposes. Such passage of heat is aided by filling the portion of the tube situated in the interior of the chamber and away from the walls of the chamber with a liquid.

In use of the apparatus the thermocouple junctions and leads are preferably electrically insulated from each other and the walls of the tube, e.g. by a thin film of varnish such as will not materially hinder the desired passage of heat. Where the walls of the tube are constructed of material of sufficient chemical resistance (e.g. beryllium oxide for the heat conducting portion) and where the varnishing of the thermocouple junctions and leads is sufficiently reliable, it is possible to use a conducting liquid such as mercury to promote heat transfer near the closed end of the tube, but normally such a refinement is unnecessary and a non-corrosive non-volatile liquid (silicone oil) is preferred. The tube advantageously has its other, i.e. the end exterior to said chamber, open end pointing upwards, since in normal use the ambient air will be warmer and hence lighter than the air near the closed end of the re-entrant tube. The preferred orientation inhibits heat exchange between the closed end of the re-entrant tube and ambient air and also permits the re-entrant tube to accommodate the heat-transfer-promoting liquid.

The liquid is preferably liquid at room temperature and freezes at just below room temperature. Normally water is used as 0° C. is the conveniently used thermocouple reference junction temperature. If water is used it should be pure, e.g. triply distilled.

The liquid is preferably contained in a sealed chamber of which the major part of the outer walls are constructed of material of good thermal conductivity (copper, silver, gold, aluminum, aluminum oxide or beryllium oxide), copper and aluminum being preferred materials.

Set into chamber walls are one or more tubes for receiving the thermocouple junctions together with a device sensitive to the change of state of the liquid, or a passage leading to such a device. As a protection against freezing up, these insets in the chamber wall may be thermally insulated, e.g. by a collar of insulating material separating them from the conducting walls.

The walls of the chamber are in good thermal contact with one set of junctions of one or more Peltier-effect devices. The opposite junctions are placed in thermal contact with a heat sink which is normally designed to dissipate heat to ambient air or to some other cooling fluid. The heat sink is normally provided with fins, and cooling may be promoted by forced circulation of air past these. Under certain conditions cooling of the heat sink by water or other suitable fluid may be desirable. Heat leaks into the chamber walls and working fluid through reference tubes, through the detecting device, from ambient and from the heat sink. Since the amount of heat from these sources is not constant but varies with fluctuations in ambient temperature, and in order to avoid an unnecessarily large heat load on the Peltier-effect device, and to prevent unnecessary and unwanted temperature differences within the chamber, the walls of the chamber are insulated thermally from ambient and from the heat sink associated with the hot junctions of the Peltier-effect device. The cooling power of the Peltier-effect device must be sufficient to cool the chamber and the working substance to the point at which the latter begins to change state and to effect such cooling while heat is leading in through the leads of all the thermocouples whose temperature it is desired simultaneously to hold constant.

The working of the device might be adversely affected by heat in-leaks less than those beyond the capacity of the Peltier-effect device. For example, if too many tubes are used, or if these are too wide, or if they become too hot, or if too many reference junctions are inserted in the re-entrant tubes, the heat in-leak through the re-entrant tubes may be insufficient to prevent ice being formed during the cooling halves of the temperature cycles, but yet be great enough for the heat being transported from the tube or tubes to set up temperature differences between the tubes or the reference junctions in the tubes on the one hand and the water-ice line on the other hand. Similarly, this heat load may increase the temperature differences within the chamber walls. Such temperature differences may or may not be acceptable according to the users' particular requirements. For example, the user may be able to make allowances for a constant and known temperature difference between the water-ice line (0° C.) and the thermocouple reference junctions, without loss in the accuracy of his temperature measurement. However, it may be possible, if need be, to reduce the heat in-leak at this point by cooling that part of the tube or tubes projecting outside the chamber, e.g. by means of an auxiliary Peltier-effect device or by means of a thermally conducting member in contact with the projecting part of the tube or tubes and with the chamber walls. The chamber walls should be thick enough to convey the heat to the Peltier-effect device without too large temperature differences appearing within these walls. The thickness needed can be reduced somewhat by the use of a number of Peltier-effect devices widely spaced about the surface of the conducting walls.

Any suitable type of detecting device may be used. The change of state is from liquid to solid, since the temperature of this change is only slightly altered by changes of pressure which are large enough to be measured easily. Water is a particularly suitable liquid since, on freezing, there is a very pronounced change in volume and or pressure which can easily be detected. Apparatus for measuring or detecting changes in volume are well known. One may use a bellows, or other flexible diaphragm or a plug of electrically conducting liquid, e.g. mercury, which moves under the influence of the volume changes resulting from the change of state until they make or break an electrical contact.

The detecting device is conveniently set to actuate the switch and halt the cooling when between 6 and 50% of the working liquid, and preferably when between 12 and 32% of the liquid, has frozen. These limits are chosen to avoid on the one hand excessive freezing which might impair the action of the detecting device and or convention currents in the chamber or otherwise cause unwanted temperature differences, whilst on the other hand with too low a setting the critical density of the ice-water mixture will be imitated by warm water. In this latter case cooling will not occur at all but if, on other grounds, a low critical degree of freezing is required, an optional by-pass of the switch can be included to be used in the case when the initial water temperature is too high.

In order that the invention may more readily be understood the following description is given with reference to the accompanying drawings, in which:

FIGURE 1 is a cross-section of one form of apparatus, excluding details of the switching device, and including two alternative forms of the tubes; and FIGURES 2 and 3 show two alternative switching circuits.

Referring to FIGURE 1, two alternative forms of tubes 1 and 1' are shown, their lower ends 2 and 2' are closed and contain a liquid 18 and 18' to promote heat transfer to and through the lower ends to thermocouples 5 (one only shown) whose reference junctions 4 are in contact with or close to the lower ends. In one case the tube is constructed of stainless steel and end 2 has a cap 19 of copper which has a very good thermal conductivity. The other has its section 2' of material of good thermal conductivity and its upper portion 3' of material of low thermal conductivity. In both cases the tubes are as thin as possible consistent with robustness. The tubes 1, 1' are set in the walls 7 of a chamber 6 whose interior 21 is filled with the water, the walls being constructed of copper. A detecting device 16 is mounted in the walls 7 by means of collars of insulating material. This construction is necessary to ensure that virtually all the change of volume during the change of state of the working liquid is taken up by the detecting device 16.

The dimensions of the tubes 1 are chosen so that the diameter is less than 20% of the portion of the tube in contact with the liquid and less than 12% of the total length of the tube. The tube is shown in the vertical position and, in order to retain the heat transfer liquid, it is preferably always within 45° of the vertical.

The chamber walls are in thermal contact with, though normally electrically isolated from, one set of junctions of a Peltier-effect cooling device 8 which causes the chamber 6 and its contents and the conducting walls to undergo a temperature cycle. The other set of junctions of the Peltier-effect device 8 is in good thermal contact but normally electrically insulated from a heat transfer block 9 pressed in position by a band 22 which presses the block 9 and the Peltier-effect device 8 and the walls 7 to make good contacts as shown. To the heat transfer block 9 is attached a frame 17 bearing fins 10 to dissipate heat to the atmosphere, although it is contemplated that the block 9 might alternatively be hollow and adapted for water cooling. The chamber 6 is thermally insulated from ambient by a layer of foamed plastic insulating material enclosed in an outer casing 12.

The detecting device 16 is in the form of a bellows, made from beryllium copper.

The switching device shown in FIGURE 2 includes a microswitch A controlling the A.C. current supplied from mains to the primary of a step-down transformer 32, from the secondary of which current is supplied to the Peltier-effect devices 8 after rectification and smoothing.

In another form of the switching device, shown in FIGURE 3, the movement of the bellows 16 controls switch A in the circuit in which the Peltier-effect device 8 is supplied from batteries 31 and 30 or, alternatively, from the rectified and smoothed output of a transformer. Switch B is controlled at ambient temperature in such a way that when this temperature is low (say below 5° C.) switch B is closed and with switch A in the position shown the current to the Peltier-effect device 8 is from battery 31 and is reversed during the heating half of the temperature cycle from the direction during the cooling period instead of being merely switched off when switch A is in the position shown. A switch C is included which permits batteries 30 and 31 to be connected in series with device 8 and extra voltage to be supplied for rapid initial cooling before the temperature cycle begins, or for use at high ambient temperatures and heavy heat load.

As ice forms in the space 21 the bellows is depressed until its movement causes switch A (FIGURES 2 and 3) to move from the upper to the lower position, thus interrupting the flow of current to the Peltier-effect device.

During the initial cooling of the liquid, in this case water, the liquid will supercool to well below its freezing point, crystals of solid will form throughout the liquid with a sudden rise of temperature to the freezing point. Normally this amount of solid formed thus will be less than the critical amount.

When the critical amount of the working substance has changed state a corresponding change takes place in the volume or pressure of the working substance and it is this which is normally detected by the detecting device which then responds to switch off the cooling. Normally this will mean that the current supply is simply switched off, but where ambient temperature is too high the current may be switched to produce a lesser and insufficient degree of cooling in the Peltier device which will permit a slower and steadier warm-up of the apparatus, and on the other hand where ambient temperature is too low this will mean that the current supply to the Peltier device will be such as to cause it to generate heat at the junctions in thermal contact with the conducting walls. By incorporating the switching device of FIGURE 3, sensitive to ambient temperature, the switching may be of the desired type according to the ambient temperature.

Switching the cooling off initiates the heating phase, during which the solid melts. At the switch off point the chamber walls will be cooler than the melting point of the liquid and freezing will continue until this ceases to be so. When the formation of a solid is beyond the critical amount, the cooling switches off, the temperature of the chamber walls rises above the freezing point of the liquid, and the solid now melts until the amount falls below the critical amount. Then the cooling is switched on again and after the chamber walls have cooled again to below the melting point, freezing begins again. This temperature cycle can be made slower, if desired, by increasing the thickness and heat capacity of the chamber walls or by means of a time delay in the switch actuated by the detection device, or made faster by reducing the thickness of the chamber walls. The existence of this cycle of temperatures in the chamber walls necessitates the precautions taken to reduce the direct heat path from the conducting walls to the closed end of the re-entrant tube and the thermocouple junctions contained therein. The temperature there is controlled rather by the liquid which melts and freezes during the cycle at substantially constant temperature. After several temperature cycles a permanent coating of solid will form along the walls increasing and decreasing in thickness during the cycles. With water as the liquid used the ice will tend to collect towards the top of the apparatus owing to the effect of convection currents, but in the case of most other liquids which contract on freezing the thickest deposits of solid will tend to be towards the bottom of the apparatus. This factor will be taken into consideration when deciding on the positions of the Peltier device, detecting device and reference tubes in the thermostat chamber, e.g. where water is the working substance, the placing of the detecting device low in the apparatus will tend to be a protection against freezing up of the detecting device.

During the heating half of the temperature cycle, the main leak in of heat may be through the Peltier device. The solid will then tend to begin to melt in the immediate vicinity of the Peltier device up against the conducting walls of the chamber. Hence, one may obtain a pool of liquid up against the walls and covered by a shell of solid. Where this pool of liquid is in contact with the main body of the liquid this effect will be beneficial, reducing the movement of the main solid liquid line in the chamber and slight temperature variants dependent thereon. However, if the pools are completely isolated, melting may take place without affecting the detecting device, thus melting well beyond the critical point may occur before the Peltier device is switched to the cooling position and an undesirably exaggerated temperature cycle may result. This trouble is readily remedied by decreasing the heat in-leak through the Peltier device during the heating half of the cycle, and/or by increasing heat in-leaks through other parts of the apparatus.

A similar effect might occur through solid forming in the vicinity of the detecting device to render it no longer responsive. This can be remedied by correct placing of this device as already discussed, and/or by allowing great heat in-leak through the detecting device by placing the detecting device close to the reference tubes in cases where the reference tubes are the main heat in-leak and/or by thermally insulating the detecting device from the conducting walls.

We claim:

1. An isothermal reference apparatus for maintaining a thermocouple junction at a reference temperature and comprising a chamber; walls to said chamber defining an interior thereto; a freezable liquid within said chamber, said liquid being freezable at a temperature close to said reference temperature; an elongated tube of circular cross-section extending through and thermally insulated from at least one of said walls, and including a first portion having a closed end situated deep into the interior of the said chamber and a second portion giving access to the exterior of the said chamber, the diameter of said tube being less than 20% of the length of said first portion; an interior wall surface to said tube closely adjacent to said closed end providing a location for at least one thermocouple junction; thermoelectric cooling means positioned adjacent the walls of said chamber effective to cool the latter to freeze the liquid therein; means sensitive to the change of state of said liquid and control means operatively associated with said sensitive means to supply current to said thermoelectric means when a certain proportion of said liquid is frozen.

2. The isothermal reference apparatus specified in claim 1 wherein the diameter of said tube is less than 12% of the total length of said tube.

3. The isothermal reference apparatus specified in claim 1 wherein said elongated tube comprises a thin-walled stainless steel tube and said closed end comprises copper.

4. The isothermal reference apparatus specified in claim 1 wherein the first portion of the tube is formed of a good thermal conductor, and the second portion is a poor thermal conductor.

5. The isothermal reference apparatus specified in claim 1 wherein said elongated tube is positioned vertically with said other end projecting upwardly from said chamber.

6. The isothermal reference apparatus as specified in claim 5 wherein said closed end of said tube is filled with a liquid providing good heat transfer properties.

7. The isothermal reference apparatus specified in claim 1 wherein said control means includes means for causing more rapid cooling when the ambient temperature is higher.

References Cited by the Examiner

UNITED STATES PATENTS

| 2,952,724 | 9/60 | Fritts | 62—3 |
|---|---|---|---|
| 2,986,890 | 6/61 | Bevans | 62—3 |
| 3,027,725 | 4/62 | Harvey | 62—3 |
| 3,091,940 | 6/63 | Feldman | 62—3 |

WILLIAM J. WYE, *Primary Examiner.*